United States Patent
Hosseinian et al.

(10) Patent No.: US 11,665,748 B2
(45) Date of Patent: May 30, 2023

(54) RACH PROCEDURES FOR NON-TERRESTRIAL NETWORKS

(71) Applicant: Samsung Electronics Co., Ltd., Suwon-si (KR)

(72) Inventors: Seyed Mohsen Hosseinian, San Diego, CA (US); Jung Hyun Bae, San Diego, CA (US); Homayoon Hatami, San Diego, CA (US); Jungwon Lee, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/359,052

(22) Filed: Jun. 25, 2021

(65) Prior Publication Data

US 2022/0030638 A1 Jan. 27, 2022

Related U.S. Application Data

(60) Provisional application No. 63/056,352, filed on Jul. 24, 2020.

(51) Int. Cl.
*H04W 74/08* (2009.01)
*H04L 5/00* (2006.01)
(Continued)

(52) U.S. Cl.
CPC ....... *H04W 74/0841* (2013.01); *H04L 5/0051* (2013.01); *H04L 27/2607* (2013.01);
(Continued)

(58) Field of Classification Search
CPC .......... H04W 74/0841; H04W 56/005; H04W 56/006; H04W 74/0891; H04W 84/06; H04L 5/0051; H04L 27/2607
See application file for complete search history.

(56) References Cited

U.S. PATENT DOCUMENTS 8,902,836 B2 12/2014 Ohta et al.
9,913,233 B2 3/2018 Abedini et al.
(Continued)

OTHER PUBLICATIONS

MediaTek Inc.: "Improving Random Access in NTN," 3GPP, R2-1905704, 3rd Generation Partnership Project (3GPP), May 2019, XP051729203, 5 pages, Retrieved from the Internet: URL:http://www.3gpp.org/ftp/Meetings%5F3GPP%5FSYNC/RAN2/Docs/R2%2D1905704%2Ezip.
(Continued)

*Primary Examiner* — Chae S Lee
(74) *Attorney, Agent, or Firm* — Lewis Roca Rothgerber Christie LLP

(57) ABSTRACT

A system and method for random access procedures in a non-terrestrial network. In some embodiments, the method includes calculating, by a user equipment (UE), a timing advance based on location information of the UE and on an ephemeris of a non-terrestrial network node. The method may further include randomly selecting a random value from a plurality of values, and sending, at a transmission time, by the UE, to the non-terrestrial network node, a random access (RA) message, which may include a signature. The transmission time may differ from a nominal transmission time by an amount based on the random value, the nominal transmission time being based on the timing advance, or the signature may differ from a nominal signature by a cyclic shift based on the random value.

19 Claims, 14 Drawing Sheets

Calculating, by a user equipment (UE), a timing advance based on location information of the UE and location information of a non-terrestrial network node (gNB)
605

Randomly selecting a random value from a plurality of values
610

Sending, at a transmission time, by the UE, to the gNB, a random access (RA) message
615

(51) Int. Cl.
     H04L 27/26    (2006.01)
     H04W 56/00    (2009.01)
     H04W 84/06    (2009.01)

(52) U.S. Cl.
     CPC ....... H04W 56/005 (2013.01); H04W 56/006 (2013.01); H04W 74/0891 (2013.01); H04W 84/06 (2013.01)

(56) References Cited

U.S. PATENT DOCUMENTS

| | | |
|---|---|---|
| 10,624,052 B2 | 4/2020 | Alasti et al. |
| 10,868,640 B2 | 12/2020 | Cao et al. |
| 2015/0319745 A1* | 11/2015 | Seo .................. H04W 72/1278 370/329 |
| 2019/0342845 A1 | 11/2019 | Laselva et al. |
| 2020/0245363 A1 | 7/2020 | Kim et al. |
| 2020/0344828 A1 | 10/2020 | Ryu et al. |
| 2021/0029658 A1* | 1/2021 | Mahalingam ...... H04B 7/18513 |
| 2022/0086786 A1* | 3/2022 | Narasimha ........ H04W 56/0005 |

OTHER PUBLICATIONS

Nokia et al., "Doppler Compensation, Uplink Timing Advance and Random Access in NTN," 3GPP, R1-1906087, 3rd Generation Partnership Project (3GPP), May 2019, XP051727544, 13 pages, Retrieved from the Internet: URL:http://www.3gpp.org/ftp/Meetings%5F3GPP%5FSYNC/RAN1/Docs/R1%2D1906087%2Ezip.

EPO Extended European Search Report dated Dec. 21, 2021, issued in corresponding European Patent Application No. 21186026.7 (9 pages).

* cited by examiner

| Back-off Indicator | RAPID | RADID | Timing Advance Command | UL Grant | UL Grant | UL Grant | Temporary C-RNTI | Temporary C-RNTI |
|---|---|---|---|---|---|---|---|---|

FIG. 2C

| Zero Correlation Zone Configuration | $N_{CS}$ value for Unrestricted set | $n_{TA}$ |
|---|---|---|
| 0 | 8 | 0 |
| 1 | 10 | 2 |
| 2 | 12 | 4 |
| 3 | 14 | 6 |

FIG. 3A

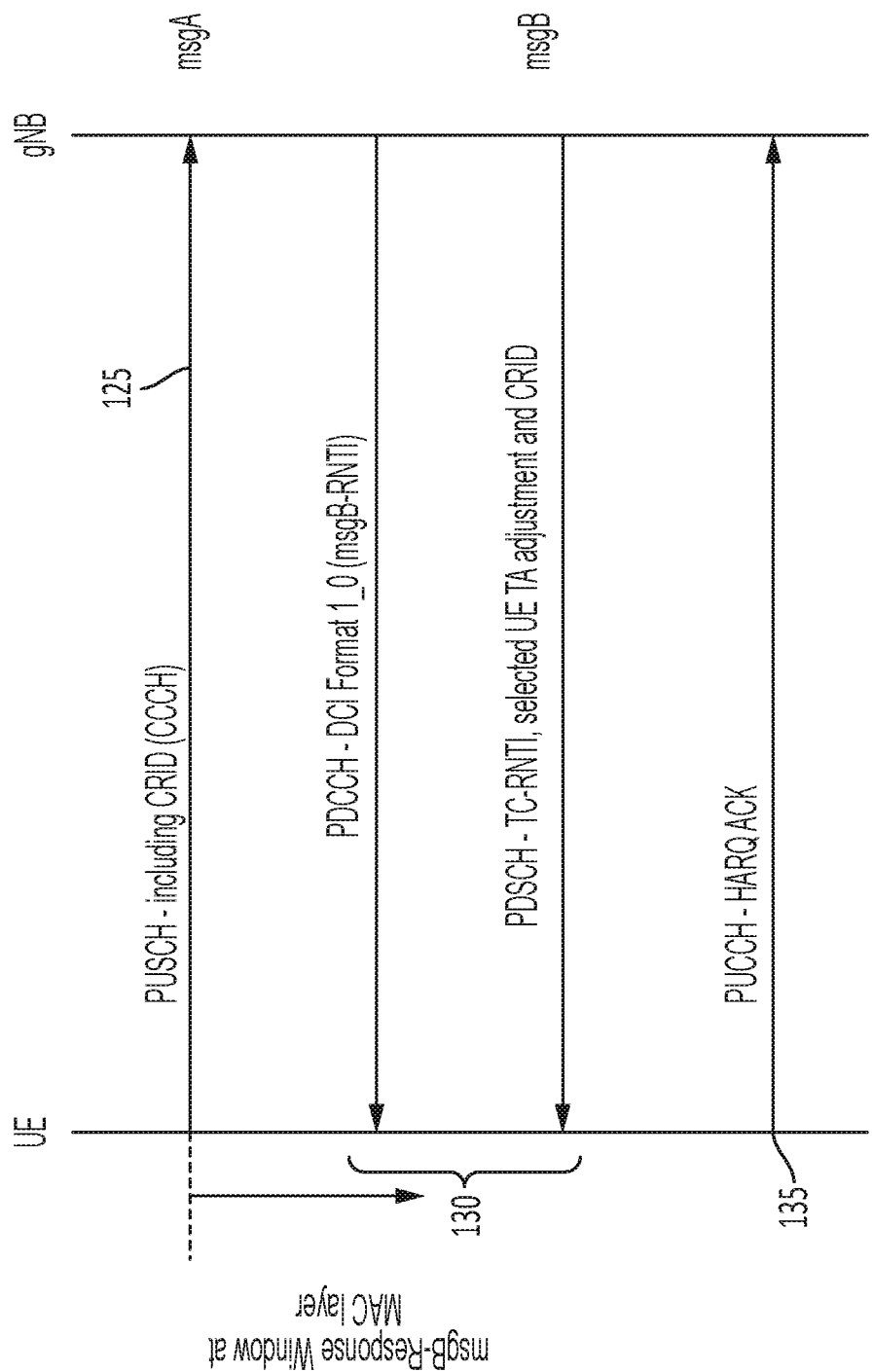

| | |
|---|---|
| Oct 1 | UE contention Resolution Identity |
| Oct 2 | UE contention Resolution Identity |
| Oct 3 | UE contention Resolution Identity |
| Oct 4 | UE contention Resolution Identity |
| Oct 5 | UE contention Resolution Identity |
| Oct 6 | UE contention Resolution Identity |
| Oct 7 | R / HARQ Feedback Timing Indicator / PUCCH Resource Indicator |
| Oct 8 | TPC / Timing Advance Fine Adjustment |
| Oct 9 | Temporary C-RNTI |
| Oct 10 | Temporary C-RNTI |

RACH PROCEDURES FOR NON-TERRESTRIAL NETWORKS

CROSS-REFERENCE TO RELATED APPLICATION(S)

The present application claims priority to and the benefit of U.S. Provisional Application No. 63/056,352, filed Jul. 24, 2020, entitled "METHODS FOR RACH PROCEDURES FOR NON-TERRESTRIAL NETWORKS", the entire content of which is incorporated herein by reference.

FIELD

One or more aspects of embodiments according to the present disclosure relate to mobile communications, and more particularly to mobile communications involving non-terrestrial networks.

BACKGROUND

In a mobile communication system, it may on occasion be advantageous for a user equipment to communicate with a non-terrestrial node, e.g., with a communications satellite. In such a situation, the round trip delay may be significantly greater than the round trip delay between a user equipment (UE) and a terrestrial network node. This may create challenges; for example, random access procedures that are reliable between a UE and a terrestrial network node may not be reliable in the presence of large round trip delays.

Thus, there is a need for a system and method for random access procedures in a non-terrestrial network.

SUMMARY

According to an embodiment of the present disclosure, there is provided a method, including: calculating, by a user equipment (UE), a timing advance based on: location information of the UE; and an ephemeris of a non-terrestrial network node; randomly selecting a random value from a plurality of values; and sending, at a transmission time, by the UE, to the non-terrestrial network node, a random access (RA) message, the RA message including a signature, wherein: the transmission time differs from a nominal transmission time by an amount based on the random value, the nominal transmission time being based on the timing advance, or the signature differs from a nominal signature by a cyclic shift based on the random value.

In some embodiments, the method further includes receiving, by the UE, the ephemeris information.

In some embodiments, the transmission time differs from the nominal transmission time by an amount based on the random value.

In some embodiments, the RA message includes a preamble sequence.

In some embodiments: the RA message is transmitted via a PRACH occasion (RO), and the amount based on the random value is less than a cyclic prefix (CP) of the RO.

In some embodiments: the RA message includes a preamble sequence, and the signature differs from a nominal signature by a cyclic shift based on the random value.

In some embodiments: each of a plurality of cyclic shifts corresponds respectively to a value of the plurality of values; a first cyclic shift of the plurality of cyclic shifts is the greatest one of the plurality of cyclic shifts less than a second cyclic shift of the plurality of cyclic shifts; and the preamble sequence shifted by: the second cyclic shift, less a maximum supported channel delay spread of the UE and the non-terrestrial network node, less an uncertainty in the calculated timing advance, is orthogonal to: the preamble sequence shifted by the first cyclic shift.

In some embodiments, the method further includes: selecting a delay value at random from a set of delay values; and transmitting, by the UE, a demodulation reference signal (DMRS) via a Physical Uplink Shared Channel (PUSCH) occasion (PO), the beginning of the transmission of the DMRS following the beginning of the PO by the delay value.

In some embodiments, the set of delay values includes integer multiples of the duration of the DMRS.

In some embodiments: the RA message includes a preamble sequence, the RA message is transmitted via a PRACH occasion (RO); and the length of the preamble sequence is at least equal to a maximum supported channel delay spread.

In some embodiments, the length of the preamble sequence is the smallest prime number at least equal to a maximum supported channel delay spread.

In some embodiments, the RA message does not contain a preamble.

According to an embodiment of the present disclosure, there is provided a system including: a user equipment (UE), the UE including: a radio; and a processing circuit, the processing circuit being configured to: calculate a timing advance based on: location information of the UE; and an ephemeris of a non-terrestrial network node; randomly select a random value from a plurality of values; and send, at a transmission time, by the UE, to the non-terrestrial network node, a random access (RA) message, the RA message including a signature, wherein: the transmission time differs from a nominal transmission time by an amount based on the random value, the nominal transmission time being based on the timing advance, or the signature differs from a nominal signature by a cyclic shift based on the random value.

In some embodiments, the processing circuit is further configured to receive the ephemeris information.

In some embodiments, the transmission time differs from the nominal transmission time by an amount based on the random value.

In some embodiments, the RA message includes a preamble sequence.

In some embodiments: the RA message is transmitted via a PRACH occasion (RO), and the amount based on the random value is less than a cyclic prefix (CP) of the RO.

In some embodiments: the RA message includes a preamble sequence, and the signature differs from a nominal signature by a cyclic shift based on the random value.

In some embodiments: each of a plurality of cyclic shifts corresponds respectively to a value of the plurality of values; a first cyclic shift of the plurality of cyclic shifts is the greatest one of the plurality of cyclic shifts less than a second cyclic shift of the plurality of cyclic shifts; and the preamble sequence shifted by: the second cyclic shift, less a maximum supported channel delay spread of the UE and the non-terrestrial network node, less an uncertainty in the calculated timing advance, is orthogonal to: the preamble sequence shifted by the first cyclic shift.

According to an embodiment of the present disclosure, there is provided a system including: a user equipment (UE), the UE including: a radio; and means for processing, the means for processing being configured to: calculate a timing advance based on: location information of the UE; and an ephemeris of a non-terrestrial network node; randomly select a random value from a plurality of values; and send, at a transmission time, by the UE, to the non-terrestrial network node, a random access (RA) message, the RA message including a signature, wherein: the transmission time differs from a nominal transmission time by an amount based on the random value, the nominal transmission time being based on the timing advance, or the signature differs from a nominal signature by a cyclic shift based on the random value.

BRIEF DESCRIPTION OF THE DRAWINGS

These and other features and advantages of the present disclosure will be appreciated and understood with reference to the specification, claims, and appended drawings wherein:

FIG. 2C is a structure for media access control (MAC) Random Access Response, according to an embodiment of the present disclosure;

FIG. 3A is a table of cyclic shift values, according to an embodiment of the present disclosure;

FIG. 5A is a sequence diagram of a random access procedure, according to an embodiment of the present disclosure;

FIG. 5C is a structure of a MAC payload with Timing Advance Fine Adjustment, according to an embodiment of the present disclosure;

FIG. 5D is a structure of a MAC payload without Timing Advance Fine Adjustment, according to an embodiment of the present disclosure;

DETAILED DESCRIPTION

Figure 1A:
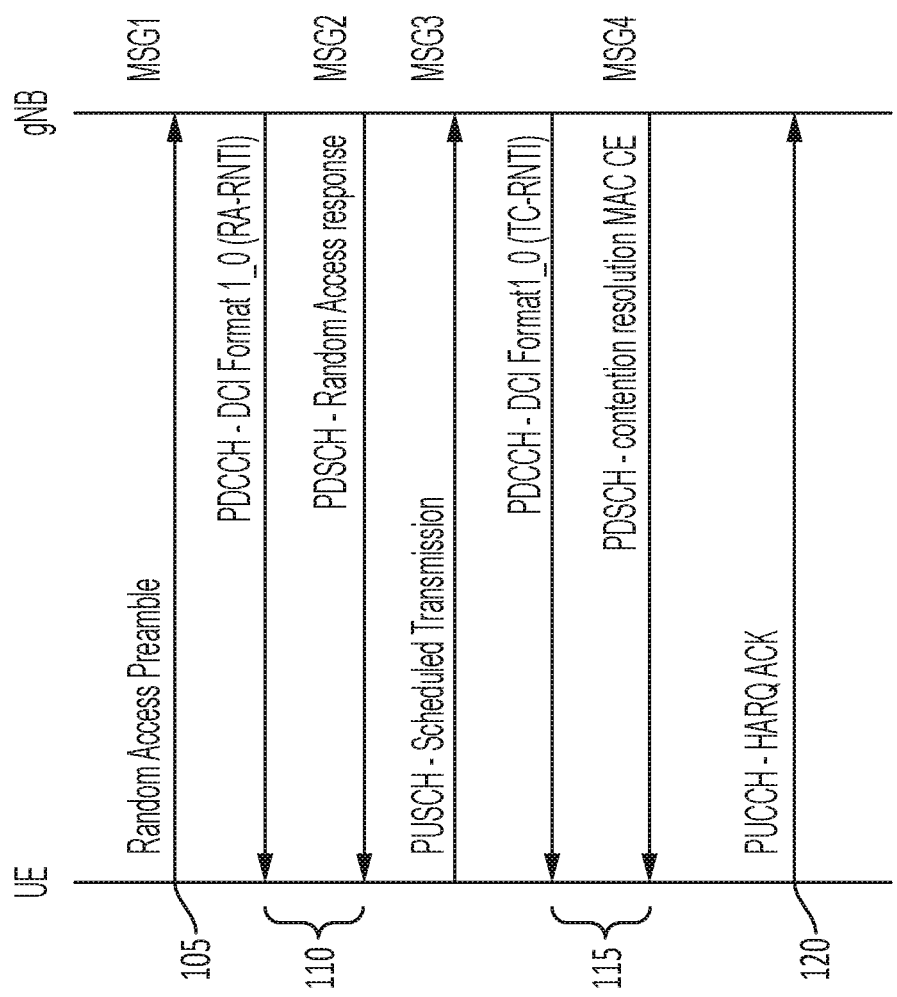
FIG. 1A is a sequence diagram of a random access procedure, according to an embodiment of the present disclosure.

The detailed description set forth below in connection with the appended drawings is intended as a description of exemplary embodiments of a system and method for random access procedures in a non-terrestrial network provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Satellite Communication systems are expected to provide solutions to complement terrestrial networks in order to extend the service to under-served and unserved remote areas. Recently, commercializing and standardization endeavors have started to incorporate satellite communications into existing cellular networks. In particular, 3GPP initiated a Study Item for 5G New Radio (NR), i.e., Non-Terrestrial Networks (NTN), to deploy satellite systems either as a stand-alone network or as an integration to 5G terrestrial networks in scenarios such as mobile broadband and machine-type communication. However, typical satellite channel impairments such as large propagation delays and high Doppler shifts create challenges to the realization of some components of NTN, such as Random Access (RA) and Timing Advance (TA).

The Random Access procedure serves multiple purposes, e.g., (i) allowing a UE to establish a connection with the gNB, (ii) synchronizing uplink timing with the network node (gNB), and (iii) beam management. One role of random access is to enable a UE in Radio Resource Control (RRC) idle mode to establish a connection with a gNB during initial access. In this case, multiple UEs may perform the procedure. Therefore, a contention based solution is specified. The specified random access procedure is an iterative process in which multiple transmissions occur between the UE and the gNB. As used herein, the phrase "user equipment" is used as a countable noun even though the noun it contains ("equipment") may not be countable in ordinary English. Similarly, the phrase Downlink Control Information (DCI) is also used as a countable noun.

One differentiating factor between the NTN and terrestrial scenarios is longer round trip delay in the NTN case, the effect of which may be magnified in a Random Access Channel (RACH) procedure with multiple iterations. A UE capable or communicating with an NTN may be able to calculate and apply a timing advance (TA) however, to pre-compensate the round trip delay, enabling solutions to some problems that may be caused by long round trip delays.

During the RACH procedure, a preamble is sent by the UE to the gNB over the PRACH channel to obtain the uplink (UL) synchronization. In 5G NR there are 64 preambles defined in each time-frequency PRACH occasion. The preamble consists of two parts cyclic prefix (CP) and a Preamble Sequence (or simply "preamble"). Ordinarily, the preamble is followed by a guard time (GT) to absorb the propagation delay. The length of the GT is called the guard period (GP). In 5G NR, 13 types of preamble format are supported. These 13 types of preamble format can be grouped into two categories: long preamble and short preamble. Differences in the time domain between different preamble formats include different (i) CP length, (ii) Sequence Length, (iii) GP length and (iv) number of repetitions.

Long preambles are based on a Zadoff-Chu (ZC) sequence length of 839. The sub-carrier spacing (SCS) for long preambles can be either 1.25 kHz or 5 kHz. The Numerology used for long preambles is different from any other NR transmissions. Long preambles can only be used for FR1 frequency bands; these frequency bands are below 6 GHz. There are four different formats for the long preamble, namely Format 0, Format 1, Format 2 and Format 3. The preamble format is part of the cell random access configuration and each cell is limited to a single preamble format. A long preamble with 1.25 kHz numerology occupies six resource blocks in the frequency domain, while a preamble with 5 kHz numerology occupies 24 resource blocks.

Short preambles are based on a sequence length of 139. The sub-carrier spacing for short preambles is aligned with the normal NR sub-carrier spacing for different numerologies, i.e., 15 kHz, 30 kHz, 60 kHz and 120 kHz. This allows the gNB receiver to use the same Fast Fourier Transform (FFT) engine for data and random-access preamble detection. Short preambles use a sub-carrier spacing of 15 kHz or 30 kHz in the case of operation below 6 GHz (FR1) and 60 kHz or 120 kHz in the case of operation in the higher NR frequency bands (FR2). A short preamble occupies 12 resource blocks in the frequency domain regardless of the preamble numerology. In general, the short preambles are shorter than the long preambles and may span only a few OFDM symbols. Short preamble formats are designed such that the last part of each OFDM symbol acts as a CP for the next OFDM symbol and the length of a preamble OFDM symbol equals the length of data OFDM symbols. In most cases it is therefore possible to have multiple preamble transmissions multiplexed in time within a single PRACH occasion (RO). Also, for short preambles there can be multiple PRACH occasions in the frequency domain as well as in the time domain within a single RACH slot. Short preambles may target primarily the small, or "normal", cell and indoor deployment scenarios. Short preambles support analog beam sweeping during PRACH reception such that the same preamble can be received with different beams at the gNB.

Cyclic shifts can be applied to ZC sequences to achieve more preamble resources. Sequences obtained from cyclic shifts of different ZC sequences are not perfectly orthogonal. Therefore, orthogonal sequences obtained by cyclically shifting a single root sequence are favored over non-orthogonal sequences; in some embodiments, additional ZC root sequences are used only when the required number of sequences (e.g. 64) cannot be generated by cyclic shifts of a single root sequence. The cyclic shift dimensioning is therefore important in the RACH design.

The cyclic shift offset $N_{CS}$ is dimensioned so that the Zero Correlation Zone (ZCZ) of the sequences guarantees the orthogonality of the PRACH sequences regardless of the delay spread and time uncertainty of the UEs. The minimum value of $N_{CS}$ may therefore be the smallest integer number of sequence sample periods that is greater than the maximum delay spread and time uncertainty of an uplink non-synchronized UE, plus some additional guard samples provisioned for the overlap of the pulse shaping filter envelope present in the PRACH receiver.

The resulting lower bound for cyclic shift $N_{CS}$ can be written as:

$$N_{CS} \geq \left\lceil \left(\frac{20}{3}r + \tau_{ds}\right)\frac{N_{ZC}}{T_{SEQ}} \right\rceil + n_f, \quad (1)$$

where r is the cell size (km), $\tau_{ds}$ is the maximum delay spread, $N_{ZC}$ and $T_{SEQ}$ are the PRACH sequence length and duration (measured in μs) respectively, and $n_f$ is the number of additional guard samples due to the receiver pulse shaping filter.

The delay spread can generally be assumed to be constant for a given environment. However, the larger the cell, the larger the cyclic shift required to generate orthogonal sequences, and consequently, the larger the number of ZC root sequences necessary to provide the 64 required preambles.

The relationship between cell size and the required number of ZC root sequences allows for some system optimization. In general, the gNB may configure $N_{CS}$ independently in each cell, because the expected inter-cell interference and load (user density) increases as cell size decreases; therefore smaller cells need more protection from co-preamble interference than larger cells.

In Rel. 16, two types of random access procedure are specified, the 4-step and 2-step random access procedures. The 2-step is an alternative to 4-step RACH, which reduces the number of successive steps or iterative transmissions between the UE and the gNB. In other words, 2-step RACH reduces the time duration of the initial access by reducing the number of sequential downlink and uplink transmissions. This characteristic of the 2-step RACH makes it suitable for NTN scenarios in which the round trip delay between the gNB and UE may be much larger than in the typical terrestrial cases.

The following several paragraphs demonstrate how the 2-step RACH compares to 4-step RACH in terms of the number of steps or transmissions.

In 4-step RACH, as depicted in FIG. 1A, the following four steps, referred to as "Step 1" through "Step 4", are specified. In Step 1, at 105, the UE randomly chooses a ZC preamble from the available pool of preambles and transmits Msg1 or the preamble in a specified RO. The gNB uses the preamble to estimate the TA and coordinate beam management. In Step 2, at 110, the gNB transmits one random access response (RAR) or Msg2 for each received preamble in an RO, regardless of the number of UEs choosing the received preamble. This response includes the estimated TA, the random access preamble identity (RAPID) of the UE, a UL grant to the UE, a temporary cell radio network temporary identifier (TC-RNTI), and a back-off indicator for UEs which receive the RAR but do not have a RAPID that matches the RAPID in the RAR. In Step 3, at 115, the UEs whose RAPID matches the RAR RAPID will transmit a Msg3 containing a contention resolution ID (CRID), according to the UL grant of the RAR message including TA application. This means that the gNB will receive the Msg3 at the expected time only if the TA of the UE matches the TA indicated by RAR. This helps a UE with the best estimated TA to have a higher chance of correct decoding at the gNB side. In Step 4, at 120, if the gNB correctly decodes a Msg3, it will transmit a Msg4 which includes the CRID of the successful UE. For a UE, the contention is complete if the content of Msg4 matches its CRID. In this case, the TC-RNTI becomes the allocated C-RNTI and the UE transmits a HARQ acknowledgment for Msg4 using a set of common resources. As explained above, the 4-step RACH takes at least two round trip delays to be completed.

Figure 1B:
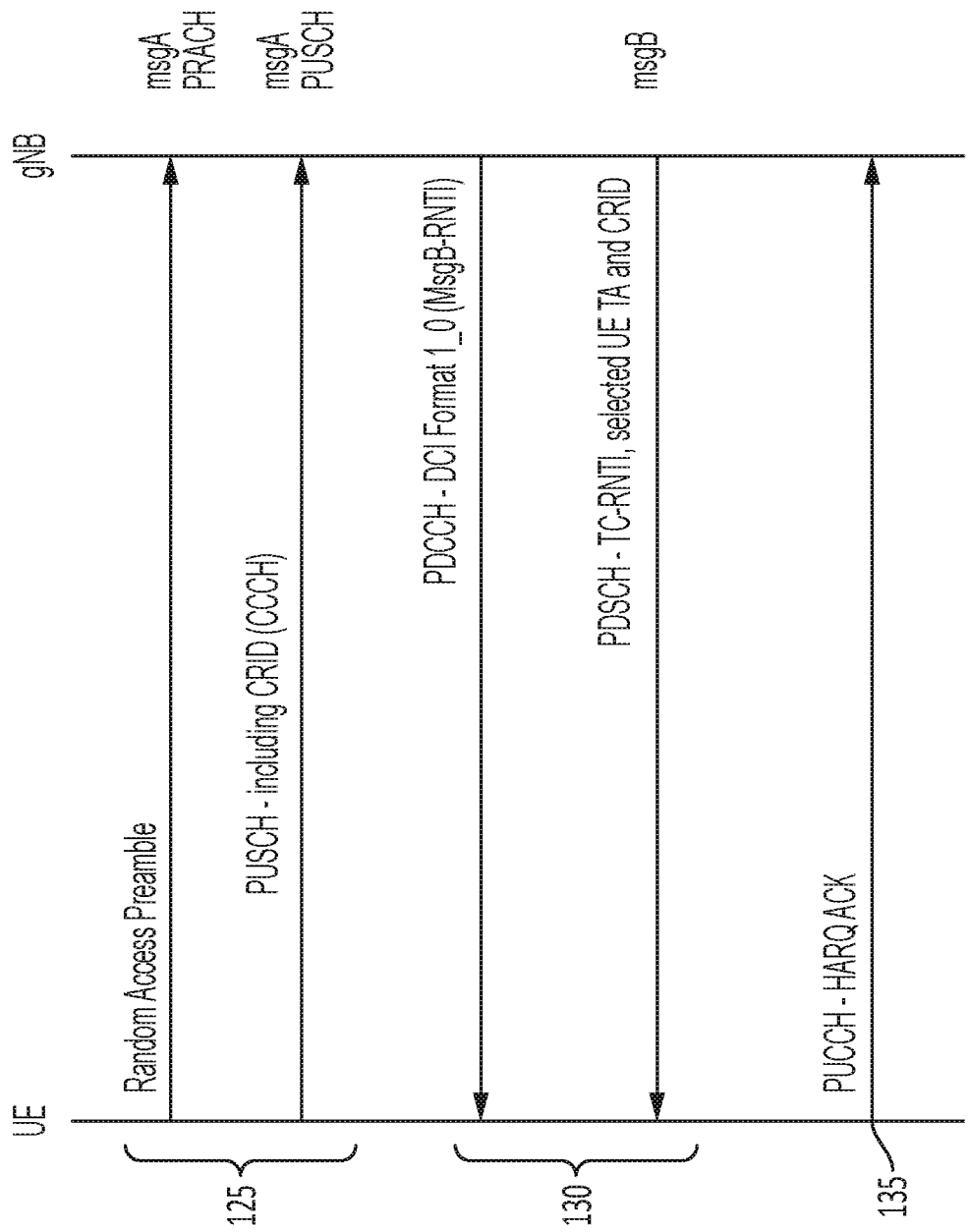
FIG. 1B is a sequence diagram of a random access procedure, according to an embodiment of the present disclosure.

In 2-step RACH, the number of sequential transmissions is reduced. To accomplish this, generally speaking, in 2-step RACH, the UE transmits PUSCH containing the CRID before receiving a RAR from gNB. As depicted in FIG. 1B, the following steps, referred to as "Step 1" and "Step 2", are specified for 2-step RACH. In Step 1, at 125, two messages are transmitted in two different slots. These two messages combined form MsgA. The first message is the MsgA PRACH which is a randomly chosen preamble from the preamble pool. The second message is called MsgA PUSCH which contains the CRID of the UE. MsgA PRACH transmission happens in an RO and the following MsgA PUSCH happens in a PUSCH occasion (PO), both depending on the selected preamble. The mapping between the preamble and RO and PO is configured by the gNB prior to the random access. In Step 2, at 130, if MsgA is decoded correctly at the gNB, the gNB transmits the RAR message, referred to as MsgB, to the UE. This message contains the TA, the TC-RNTI and the CRID of the UE. In the special case that the MsgA PRACH is received but the MsgA PUSCH is not received, the MsgB contains UL grant for the UE to transmit its PUSCH as a fallback. If the CRID of the UE matches the CRID contained in decoded RAR, the random access is completed and the UE transmits, at 135, a HARQ acknowledgement and its TC-RNTI is promoted to C-RNTI. As explained above, 2-step RACH takes at least one round trip to be completed compared to the two round trip delay (RTD) in 4-step RACH.

The current preamble design of Rel-16 may not support the large RTD and frequency offset due to Doppler shift of NTN scenarios. Therefore, in the latest work item for NTN, a UE having the capability to calculate and pre-compensate the TA is proposed. Such a UE may be a Global Navigation Satellite System (GNSS) based UE with access to ephemeris data that contains information about the orbital trajectories of artificial satellites (e.g., the UE may receive the ephemeris data from the network). Such a UE can calculate the distance to the satellite, and consequently estimate the round trip delay. In situations in which the gNB is on the ground and the satellite is a separate network node from the gNB (and the satellite retransmits, to the UE, transmissions received from the gNB and retransmits, to the gNB, transmissions received from the UE), the UE may also receive information about the timing advance corresponding to the delay between the gNB and the satellite (which may be referred to as the "common timing advance"), or it may calculate the common timing advance based on (i) the location of the gNB and (ii) the ephemeris data. Considering these assumptions, the RACH procedure may be redesigned to support NTN UEs. As such, in some embodiments, the RACH design may be modified in several respects.

In some embodiments, an intentional random delay is applied to the MsgA preamble or to the Msg1 preamble. In 2-step RACH, as described above, the MsgA consists of a PRACH preamble and a PUSCH transmission, known as MsgA PRACH and MsgA PUSCH, respectively. 2-step MsgA PRACH preambles are separated from 4-step PRACH preambles; however, they can be transmitted in the same PRACH Occasions (ROs) as 4-step PRACH ROs, or in separate ROs. The PUSCH transmissions are organized into PUSCH Occasions (POs) which can span multiple symbols and physical resource blocks (PRBs) with optional guard periods and guard bands between consecutive POs. Each PO consists of multiple demodulation reference signal (DMRS) ports and DMRS sequences. Each DMRS port or DMRS sequence pair is known as a PUSCH resource unit (PRU). 2-step RACH supports at least one-to-one and multiple-to-one mappings between the preambles and PRUs.

For NTN operation, it is assumed that the UE has GNSS capability, such that it knows its own geolocation information. The network will provide the UE with enough information such that it can accurately calculate the value of the timing advance. For example, all or some of the following information can be sent to the UE to calculate the value of the timing advance: the ephemeris data of the satellite, the geolocation information of the gateway, the geolocation information of an arbitrary reference point in space, and a cell-specific common timing advance value.

This information can be broadcast in the cell and sent to all UEs of the cell via, e.g., a system information block (SIB). The ephemeris data of the satellite can also be broadcast in the cell and sent to all UEs of the cell via, e.g., a SIB. Alternatively, the information can be indicated to the UEs by dedicated signaling. For instance, when a UE is in RRC connected mode and the satellite switches the gateway, the satellite may update the reference point geolocation information in the broadcast channel and also send update information about the new reference point geolocation to connected UEs via dedicated signaling, such as in a DCI (Downlink Control Information) or in a MAC-CE (MAC Control Element). The UE, hence, is able to accurately calculate the timing advance value for full or partial timing advance compensation.

The UE is also assumed to have acquired the downlink timing information prior to initiating the RACH procedure. This way the UE has the information about both 2-step and 4-step ROs. With the assumptions above, the UE can transmit the preamble with accurate timing such that the preamble arrives at the gNB precisely at the beginning of the PRACH occasion.

Figure 2A:
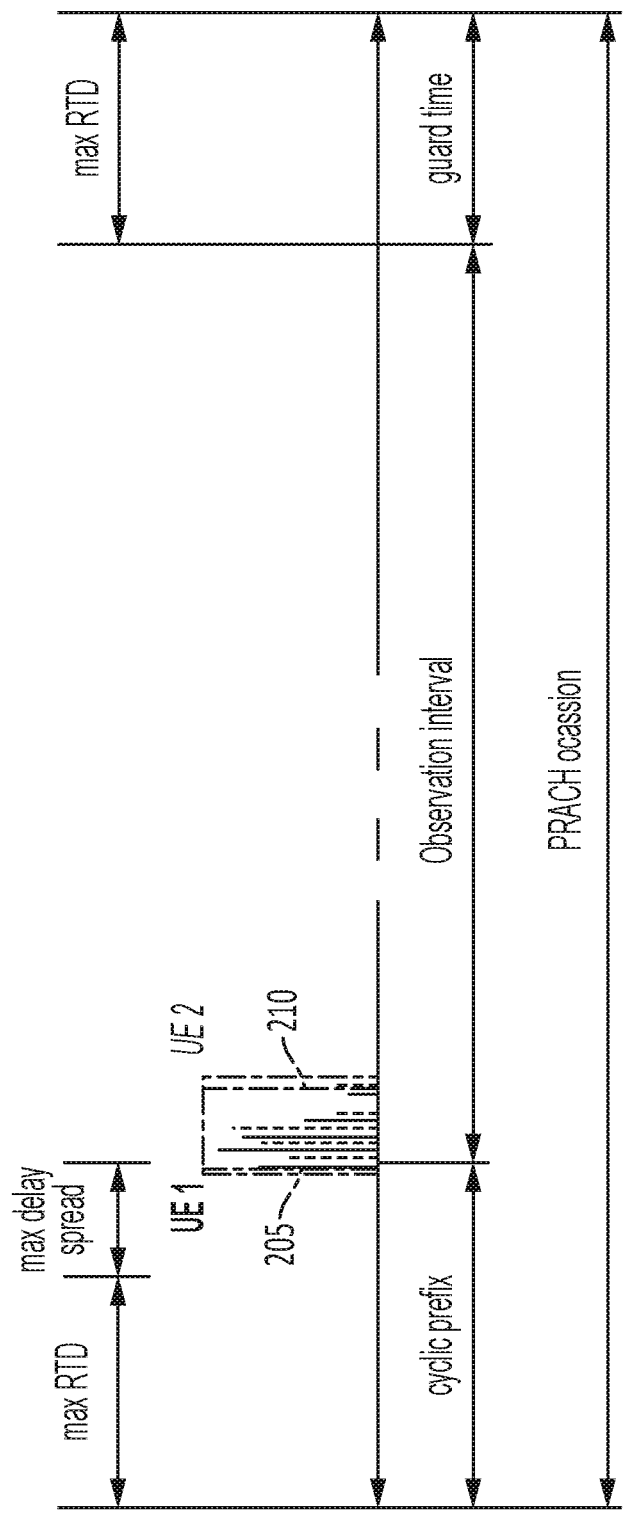
FIG. 2A is a correlator output graph, according to an embodiment of the present disclosure.

If two or more UEs select the same signature (the same preamble sequence with the same cyclic shift), since they transmit their signatures using propagation delays and timing advances which have been accurately calculated, their signatures arrive at the gNB together, i.e., at the same time. As a result, contention occurs and the gNB is not able to differentiate between the different UEs that have initiated the RACH procedure. Eventually, in the further steps of the RACH procedure, after the contention resolution step, in the best case scenario only one of the UEs will succeed and other UE(s) will be dropped. FIG. 2A shows an example of how the power delay profiles (PDPs) of two UEs that use the same signature in the same RO will collide. As shown, the PDPs 205, 210 of two signatures that are received by the gNB within the observation interval are on top of each other. In such a case the gNB may be unable to differentiate between the two UEs.

In some embodiments, a UE that is going to initiate a random access procedure, either by transmitting a MsgA preamble in 2-step RACH or by transmitting a Msg1 preamble in 4-step RACH, selects a signature from the available PRACH signatures. The UE then calculates the accurate propagation delay and timing advance and then adds a randomly selected delay value and transmits the signature by applying the accurate timing advance and the randomly selected delay. The UE is configured by the network with a set of available random delay values. The random delay values may be cell specific; i.e., a set of available random delay values are broadcast to the cell, and all UEs that belong to the cell use the same set. Consecutive delay values of the set of available random delay values may differ by (i.e., may be separated by) the maximum assumed delay spread that the network is operating in, plus an additional guard time provisioned for the error in the UE's location-based timing advance estimation. On the other hand, the delay value may be no larger than the cyclic prefix (CP) of the PRACH. In one example, the set of delay values $\tau_k$ may be:

$$\tau_k = \frac{CP}{K} k, k = 0, 1, \ldots, K-1,$$

where K is the number of available delays, which is determined as:

$$K = \left\lfloor \frac{CP}{\tau_{ds} + e_{TA}} \right\rfloor$$

where $\tau_{ds}$ is the maximum assumed delay spread, and $e_{TA}$ is the guard time provisioned for the error in the UE's timing advance estimation.

For example, if the CP duration is 103.13 µs and the assumed delay spread is 5.2 µs, if $e_{TA}$ is 0.5 µs, then K=18, and the delay values can be selected to be equally apart by (i.e., separated by) 5.73 µs. That is, the set of delay values $\tau_k$ will be:

$\tau_k = 5.73 k \mu s, k=0,1,\ldots,17$

Figure 2B:
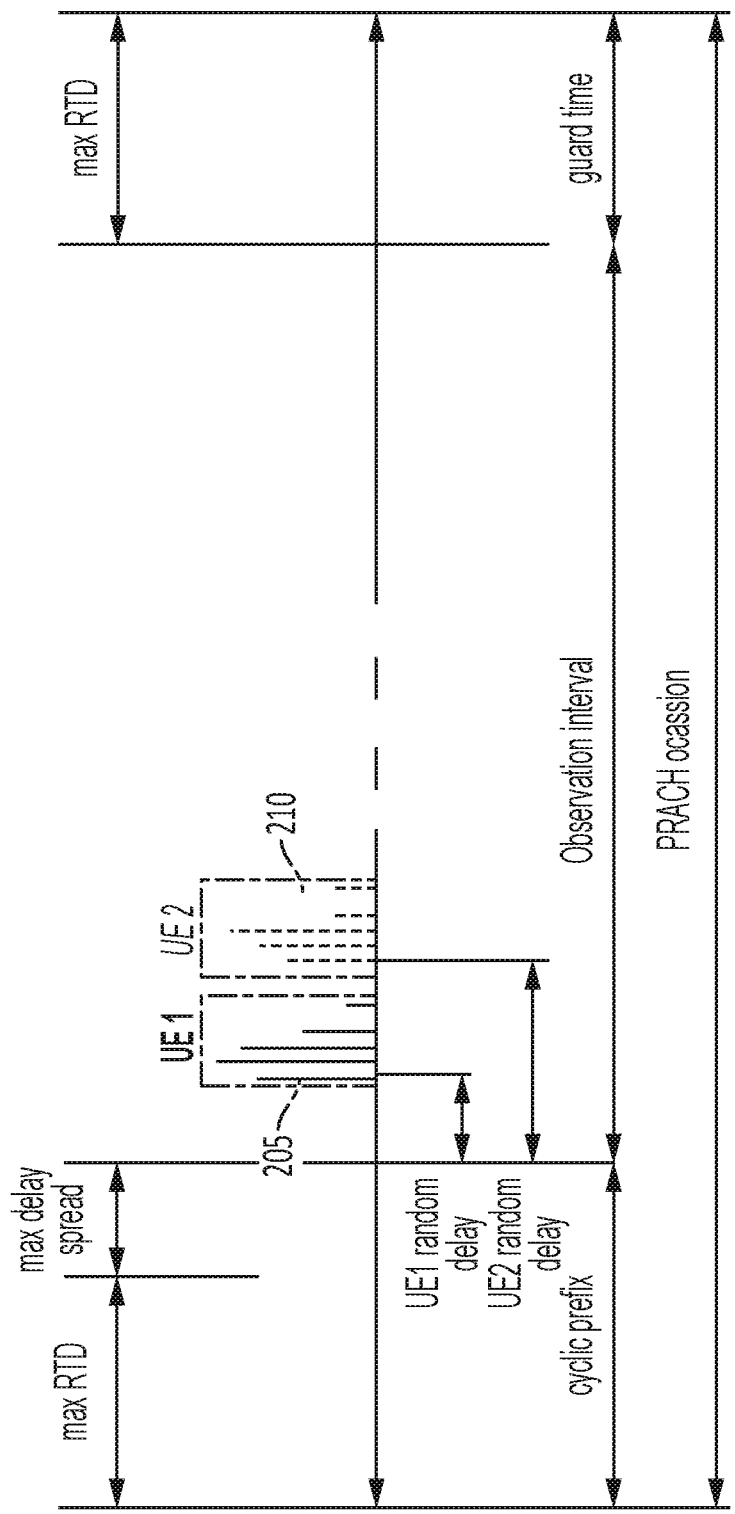
FIG. 2B is a correlator output graph, according to an embodiment of the present disclosure.

In some embodiments, the delay values are selected to be farther apart from each other (e.g., such that every two adjacent signatures are separated by a larger delay) to provide a greater marginal distance between them. The network determines the available delay values for all PRACH formats according to the above criteria and configures the UEs with the table of available delay values. FIG. 2B shows an example in which two UEs transmit the same signature using two different intentional random delay values. The gNB can differentiate between the two signatures and will know that there are two different UEs that are trying to instantiate random access in the same RO. The gNB then takes appropriate action accordingly, depending on whether a 2-step or 4-step RACH procedure is being employed, to continue with the RACH procedure for two or more UEs, separately.

To differentiate between UEs that apply different random delays, a new identification field, i.e. Random Access Delay Identity (RADID), may be included in the random access response. For example, for 4-step RACH, in the Msg2 random access response, the gNB may address the UE not only by its Random Access Preamble Identity (RAPID), but also by its RADID. FIG. 2C illustrates an exemplary structure for a MAC random access response. As shown, besides RAPID, a filed called RADID is added to show that the addressed UE is the one that had used a specific random delay with RADID identification. The field sizes (in bits) in FIG. 2C may be chosen as required. The sizes shown in FIG. 2C are for illustration only and are not to be scaled.

For 2-step RACH, a RADID field may similarly be included in the MsgB PDSCH, such that the addressed UE recognizes that the gNB is addressing the UE with the indicated RADID.

In some embodiments, intentional cyclic shift may be applied to the MsgA preamble and to the Msg1 Preamble. In one such embodiment, a UE selects a signature from the available PRACH signatures and initiates the random access procedure, either by transmitting a MsgA preamble in 2-step RACH or by transmitting a Msg1 preamble in 4-step RACH. The UE calculates the accurate propagation delay and accordingly the timing advance and then transmits the signature preamble using the calculated timing advance.

The cyclic shift offset $N_{CS}$ may be dimensioned in such a way that the orthogonality of the preamble sequences is guaranteed by the Zero Correlation Zone (ZCZ) of the sequences regardless of the delay spread and time uncertainty of the calculated timing advance by the UE. The minimum value of $N_{CS}$ may therefore be the smallest integer number of sequence sample periods that is greater than the maximum delay spread plus some additional guard samples provisioned for the overflow of the pulse shaping filter envelope present in the PRACH receiver, plus additional samples to account for the time uncertainty of the timing advance calculated by the UE.

The resulting lower bound for cyclic shift $N_{CS}$ can be written as:

$$N_{CS} \geq \left\lceil \tau_{ds} \frac{N_{ZC}}{T_{SEQ}} \right\rceil + n_f + n_{TA}, \quad (2)$$

where $\tau_{ds}$ is the maximum delay spread in µs, $N_{ZC}$ and $T_{SEQ}$ are the preamble sequence length and duration (measured in µs) respectively, $n_f$ is the number of additional guard samples due to the receiver pulse shaping filter, and $n_{TA}$ is the number of additional samples to compensate for the time uncertainty of the timing advance calculated by a UE. Using a cyclic shift satisfying this lower bound ensures that two shifted preamble sequences, of which a one is shifted by $N_{CS}$ more than the other, will be orthogonal at the gNB even if the delay spread and the uncertainty in the calculated timing advance both reduce the effective cyclic shift difference at the gNB.

The delay spread can generally be assumed to be constant for a given environment. However, the larger the cell, the larger the cyclic shift required to generate orthogonal sequences, and consequently, the larger the number of ZC root sequences necessary to provide the required number of preambles.

By selecting larger values for $n_{TA}$ the cyclic shift values can be selected such that two adjacent signatures are more apart from each other (i.e., have respective cyclic shift offsets that differ more) to provide a greater marginal distance between them. The network determines the available cyclic shift values for all PRACH formats according to the above criteria and configures UEs by the table of available cyclic shifts.

Unlike equation (1), in equation (2) $N_{CS}$ does not depend on cell radius. Therefore, there is no need to have 16 different Zero Correlation Zone Configurations as specified in Release 16 in 3GPP TS 38.211 v16.0.0, "Physical channels and modulation (Release 16)" (referred to herein as the "Physical Channels and Modulation Document"). In the Physical Channels and Modulation Document, 16 different Zero Correlation Zone Configurations are specified to support different ranges of cell radius. Here in theory it is sufficient to have one Zero Correlation Zone Configuration. However, because in practice different UEs may have different capabilities for timing advance estimation, to support several values of $n_{TA}$ several Zero Correlation Zone Configurations may be defined. In one example, using equation (2), only four Zero Correlation Zone Configurations are defined to support four different values of $n_{TA}$. The table of FIG. 3A provides, for one example, $N_{CS}$ values for four different Zero Correlation Zones corresponding to $n_{TA}$ values of 0, 2, 4 and 6, respectively. In the table of FIG. 3A, it is assumed that $N_{ZC}=L_{RA}=839$, $\tau_{ds}=5.2$ µs, $n_f=2$, and $T_{SEQ}$ is chosen to be 800 µs for a preamble subcarrier spacing of $\Delta f^{RA}=1.25$ kHz.

The table of FIG. 3A may replace Table 6.3.3.1-5 in the Physical Channels and Modulation Document. Other tables, e.g., Tables 6.3.3.1-6 and 6.3.3.1-6 in the Physical Channels and Modulation Document, can be similarly replaced using the same methodology.

Figure 3B:
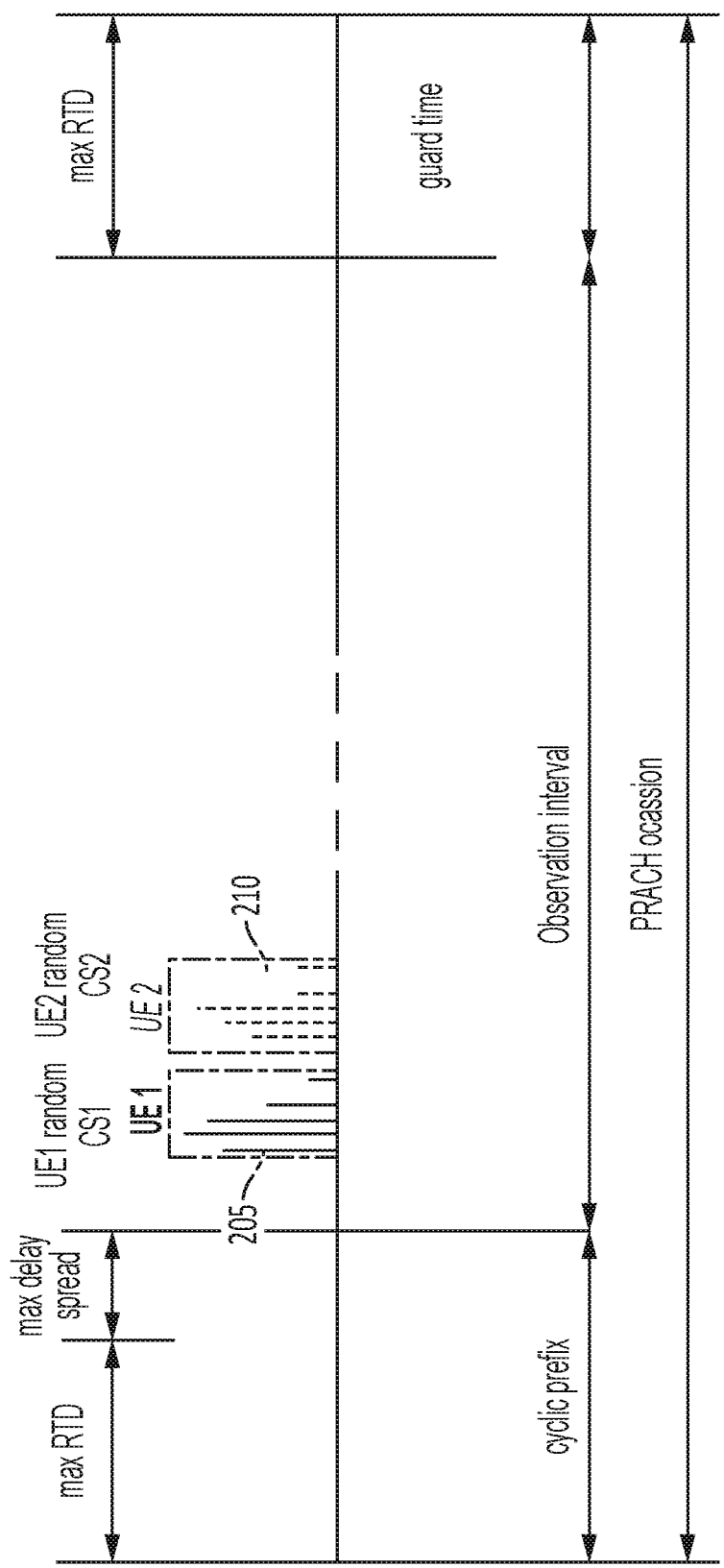
FIG. 3B is a correlator output graph, according to an embodiment of the present disclosure.

FIG. 3B shows an example in which two UEs transmit the same signature using two different randomly chosen cyclic shift values. The gNB can differentiate between the two signatures and will know that there are two different UEs that are trying to instantiate random access in the same RO. The gNB then takes appropriate action accordingly, depending on whether a 2-step or 4-step RACH procedure is being employed, to continue with the RACH procedure for two or more UEs, separately.

In some embodiments, very short sequences are used for the PRACH preamble. One factor for determining the appropriate sequence length for the PRACH preamble is the requirement for supported cell size. For example, the length of the cyclic prefix may be greater than the supported maximum round trip delay plus the maximum channel delay spread (for example, see FIG. 2B). The preamble sequence length may be greater than the cyclic prefix. Therefore the preamble sequence length may also be greater than the supported maximum round trip delay plus the maximum channel delay spread. For GNSS-based UEs that can pre-compensate for round trip delay, the cyclic prefix does not have to take into account the round trip delay, and it could be as short as the maximum channel delay spread only. In such a case, consequently, in theory the length of PRACH preamble sequence may also be as short as the maximum supported channel delay spread.

In one embodiment, the length of the PRACH preamble sequence is chosen to be at least greater than the maximum supported channel delay spread. On the other hand, if the preamble sequence is chosen from the ZC sequence family, to guarantee optimal cross-correlation properties for the sequence, the length of the sequence may be a prime number. Therefore, in one example the length of the PRACH preamble sequence is chosen to be the smallest prime number greater than the maximum supported channel delay spread.

The principle of using cyclic shifts for a sequence to increase the number of preamble resources may be applied to this embodiment as well. Especially if the length of the preamble sequence is for any reason chosen to be moderately larger than the channel delay spread, it is possible to apply cyclic shifts to the sequence to provide multiple sequences. The cyclic shift length may be greater than the supported channel delay spread.

In some embodiments, intentional random delay is applied to the MsgA PUSCH. In some embodiments, if a UE is using the 2-step RACH procedure, the UE selects the same delay applied to the preamble (that is selected according to the method, described above, for applying intentional random delay to the MsgA preamble or the Msg1 preamble) and applies it also to the MsgA PUSCH transmission. Alternatively, if an intentional cyclic shift is applied to the MsgA preamble or the Msg1 Preamble, as explained above, the UE can select a delay corresponding to the selected cyclic shift. The mapping between the delay values and cyclic shift values is predetermined and known to both the UE and the network.

Figure 4:
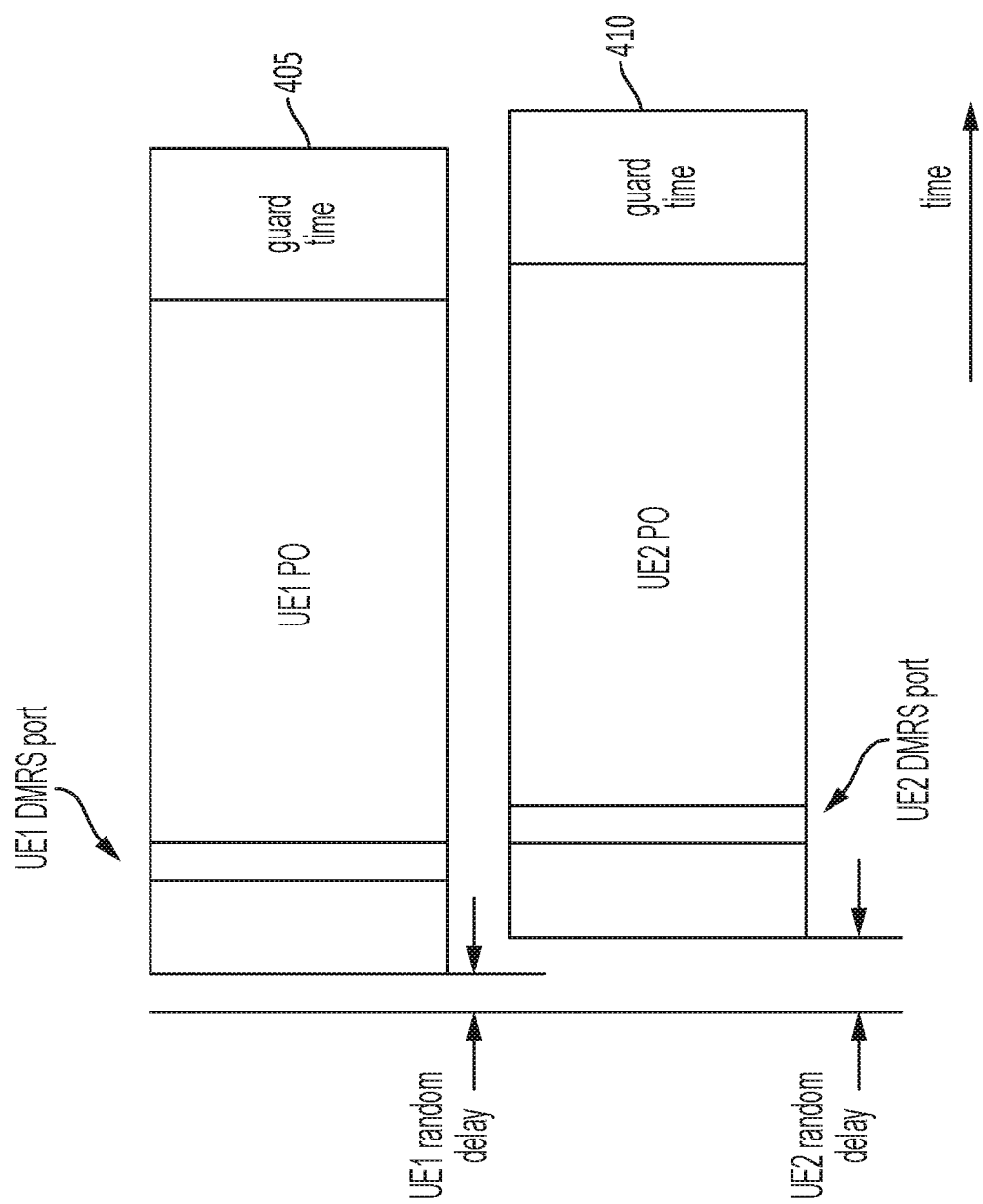
FIG. 4 is a timing diagram of transmissions from two UEs, according to an embodiment of the present disclosure.

In case the mapping between the preambles and PRUs is one-to-one, if two or more UEs use the same preamble in the same RO, they will end up using the same PRU for MsgA PUSCH transmission. In case the mapping between the preambles and PRUs is multiple-to-one, even if some UEs use different preambles in different ROs, there is still a chance that they will use the same PRU for MsgA PUSCH transmission. In both cases PRU DMRS ports from several UEs will interfere with each other. This causes deterioration in channel estimation and hence the performance of MsgA PUSCH detection will be compromised. As a result of the application of random delays by the UEs, the probability of DMRSs from different UEs interfering with each other may be reduced, as shown in FIG. 4, which shows two transmissions 405, 410, from two respective UEs, the DMRSs of which do not overlap in time. Therefore, PUSCH channel estimation performance will be enhanced. The random delay applied to MsgA PUSCH could be any arbitrary value, e.g., the same value as the intentional random delay applied to MsgA preamble (in the manner explained above). However, in order to avoid DMRSs from different UEs interfering with each other, an integer multiple of the DMRS duration, i.e., of the OFDM symbol duration, may be selected as the random delay value.

In one embodiment, there may be a mapping between the intentional random delay applied to the MsgA preamble (in the manner explained above) and the intentional delay applied to MsgA PUSCH. The mapping could be one-to-one, or one-to-many, or many-to-one, depending on the number of available delays in both mechanisms. In a simple example the same intentional delays can be applied to both the MsgA preamble and the MsgA PUSCH, i.e., a simple one-to-one mapping may be used.

In another embodiment, there may be a mapping between the intentional cyclic shift applied to the preamble (in the manner explained above) and the intentional delay applied to MsgA PUSCH. The mapping could be one-to-one, or one-to-many, or many-to-one, depending on the number of available cyclic shifts and delays in the two mechanisms, respectively.

In such embodiments, the gNB will have been able, in the previous step, to detect the presence of the preamble and also will have extracted the timing information of the preamble. Hence, the gNB will have the timing information of the MsgA PUSCH and the DMRS at both slot level and symbol level. In other words, the gNB will not have to extract MsgA timing information by blind detection.

In some embodiments, the UEs of a cell are configured with a set of MsgA PUSCH POs that overlap partially in the time domain. The configuration provides a set of starting points for MsgA PUSCH within the PO allocated resources. In one example, the UE can randomly choose a configuration and transmit MsgA PUSCH accordingly. There may be a mapping between the above configurations and (i) the intentionally applied random delays to MsgA preamble (as explained above for embodiments in which an intentional random delay is applied to the preamble), or (ii) the applied random cyclic shifts (as explained above for embodiments in which an intentional cyclic shift is applied to the preamble), or (iii) the short preamble sequences (as explained above for embodiments in which short preamble sequences are used). In case of a preamble-less random access procedure, in which a MsgA preamble does not exist (as explained below) there is no such mapping between MsgA PUSCH configurations and preambles (since preambles do not exist), and the UE may randomly chose a MsgA PUSCH configuration.

In some embodiments, a contention based preamble-less random access procedure is employed. In 2-step RACH, the MsgA consists of a PRACH preamble and a PUSCH transmission, known as MsgA PRACH and MsgA PUSCH, respectively. The UE initiates the random access procedure by sending the preamble in a preconfigured RO. By receiving a preamble in an RO, the gNB will be informed of the presence of a UE that is trying to access the network. The gNB will also extract the timing information of the UE's uplink transmission from the received preamble, and will transmit the timing advance value for the UE in MsgB. However, in a NTN, if a UE has GNSS capabilities, it can accurately calculate the value of the timing advance, and it does not need the timing advance information sent by the gNB in MsgB.

In one embodiment, a UE initiates the random access procedure by first sending a MsgA PUSCH. A pool of available POs and corresponding PRUs will have already been configured by the network prior to the random access procedure. The UE randomly selects a PO and the available PRU and transmits an RRC connection request in MsgA PUSCH using an accurate calculated timing advance. FIG. 5A shows the procedure for a 2-step contention based preamble-less random access procedure.

Figure 5B:
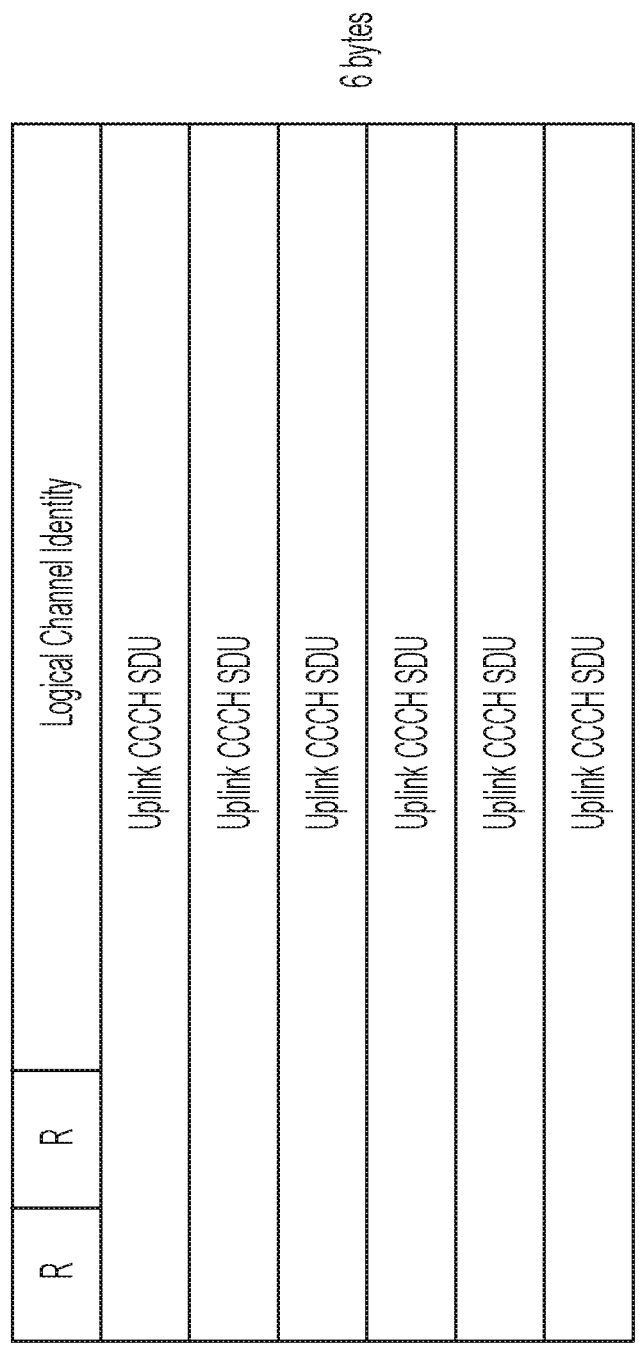
FIG. 5B is a structure of an uplink common control channel message for a radio resource control connection request, according to an embodiment of the present disclosure.

An RRC connection request, for example, can be sent in a common control channel (CCCH) that consists of six bytes as shown in FIG. 5B. An example of an uplink CCCH message for an RRC connection request CCCH message could contain a UE contention resolution identity (CRID) and the RRC connection request type and is applicable to the UE making the transition from RRC Idle or RRC Inactive to RRC Connected. In other words, the CCCH message can be an RRCSetupRequest or RRCResumeRequest. It could also be applicable to a UE re-establishing an RRC Connection and to a UE requesting On-demand System Information.

Upon receiving a MsgA PUSCH, the gNB that is monitoring the PO will detect the presence of the MsgA PUSCH and decode it. The gNB first performs channel estimation using the DMRS in the MsgA PUSCH. In case two or more UEs are using the same PO, to avoid DMRS interference a technique similar to the intentional cyclic shift described above can be applied to MsgA PUSCH transmission to reduce the level of DMRS interference. The gNB then calculates the precise timing advance value for the UE. Even though the UE has calculated the timing advance prior to MsgA PUSCH transmission, there is a chance that the timing advance still needs a final fine adjustment.

In random access procedures in which the gNB calculates the full TA, the gNB then transmits, in the next step, the timing advance command, $T_A$, which contains the value of the full TA (as specified in 3GPP TS 38.321 v16.0.0, "Medium Access Control (MAC) protocol specification (Release 16)."). In such a case, the timing advance command, $T_A$, indicates $N_{TA}$ values by index values of $T_A=0, 1, 2, \ldots, 3846$, where an amount of the time alignment with SCS of $2^\mu \cdot 15$ kHz is:

$$N_{TA}=T_A \cdot 16 \cdot 64/2^\mu$$

$N_{TA}$ is defined in the Physical Channels and Modulation Document and is relative to the SCS of the first uplink transmission from the UE after the reception of the random access response.

However, in some embodiments, (in which the addressed UE has already calculated the timing advance value), in the next step the gNB may transmit a timing advance fine adjustment command. A timing advance fine adjustment command indicates adjustment of the value currently calculated by the UE, $N_{TA\_UE}$, to the new $N_{TA}$ value, $N_{TA\_new}$, by index values of, e.g., $T_A=0, 1, 2, \ldots, 63$, where for a SCS of $2^\mu \cdot 15$ kHz, $$N_{TA\_new}=N_{TA\_UE}+(T_A-31) \cdot 16 \cdot 64/2^\mu \qquad (3)$$

In the next step, the gNB forms a MAC payload for random access response to be transmitted as MsgB PDSCH. This MAC payload includes the first 48 bits belonging to the uplink CCCH Service Data Unit (SDU) within the MsgA PUSCH (that is used as the UE Contention Resolution ID, CRID), the HARQ Feedback Timing Indicator, the PUCCH Resource Indicator, the TPC command, the Timing Advance Fine Adjustment, and the temporary C-RNTI. FIG. 5C shows an example of the content and the required amount of information for a MsgB PDSCH MAC payload. In this example the MAC payload as shown is octet aligned. The bit field shown as R is a reserved bit for future use and is set to "0". The descriptions for the UE Contention Resolution ID, the HARQ Feedback Timing Indicator, the PUCCH Resource Indicator, and the TPC command are found in 3GPP TS 38.213 v16.0.0, "Physical layer procedures for control (Release 16)." and 3GPP TS 38.321 v16.0.0, "Medium Access Control (MAC) protocol specification (Release 16).". The Timing Advance Fine Adjustment is a 6-bit field and is used for $T_A$ in Equation (3).

Figure 5D:
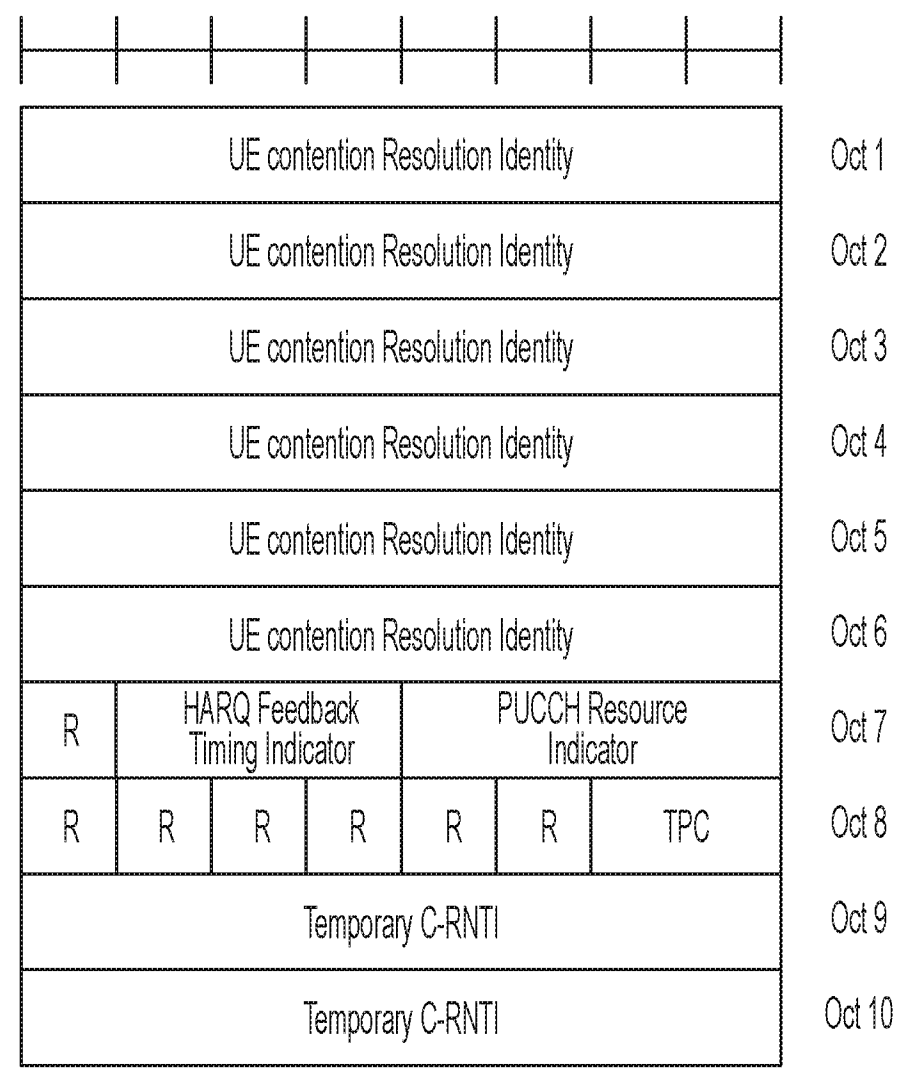

In another embodiment, the Timing Advance Fine Adjustment is not sent in the MAC payload random access response. For cases in which the timing advance measured by the GNSS-based UE is accurate enough, there is no need to send a timing advance fine adjustment in the random access response. Any timing drift may be taken care of regularly later on by a timing advance adjustment command. In such a case the MAC payload random access response may include a 48-bit CRID, the HARQ Feedback Timing Indicator, the PUCCH Resource Indicator, the TPC command, and the temporary C-RNTI. FIG. 5D shows an example of the content and the required amount of information for the MsgB PDSCH MAC payload in this case.

The MsgB PDSCH is scheduled using a PDCCH that contains DCI format 1_0 and is scrambled using the MsgB-RNTI. When the UE receives the MsgB PDSCH and decodes it successfully, it compares the CRID in the MsgB to the CRID that the UE had sent in the MsgA PUSCH. If they match, the UE will assume that the gNB has recognized the MsgA. It then applies the timing advance fine adjustment and, using the temporary C-RNTI provided by the gNB, sends HARQ ACK feedback to the gNB. This will finalize the random access procedure.

If the CRID in MsgB does not match the CRID in MsgA then it means that a contention has occurred and the MAC control element (CE) is intended for a different UE. In this case, the UE returns to the transmission of MsgA PUSCH (assuming that the maximum number of MsgA PUSCH has not been reached).

In step one, after sending a MsgA PUSCH, the UE will start a timer, e.g., msgB-ResponseWindow. If the UE does not receive MsgB PDCCH (and PDSCH) before this timer expires, the UE will assume that the MsgA PUSCH has not been received by the gNB. The UE will then re-initiate a new random access procedure by selecting a PO and sending a new MsgA PUSCH.

Figure 6:
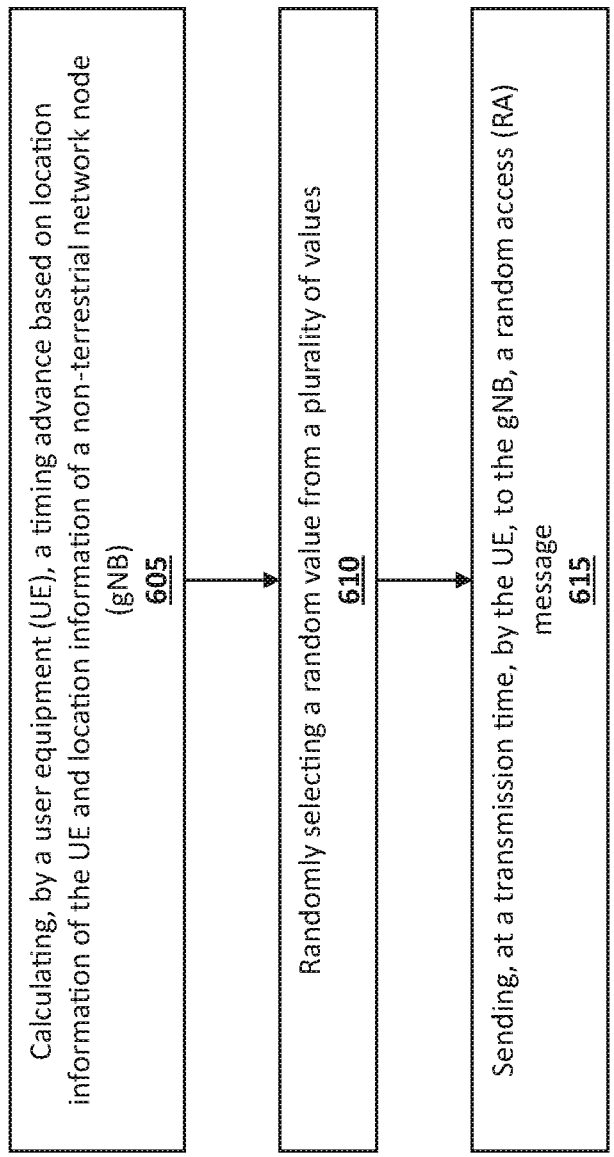
FIG. 6 is a flowchart of a method, according to an embodiment of the present disclosure.
Figure 7:
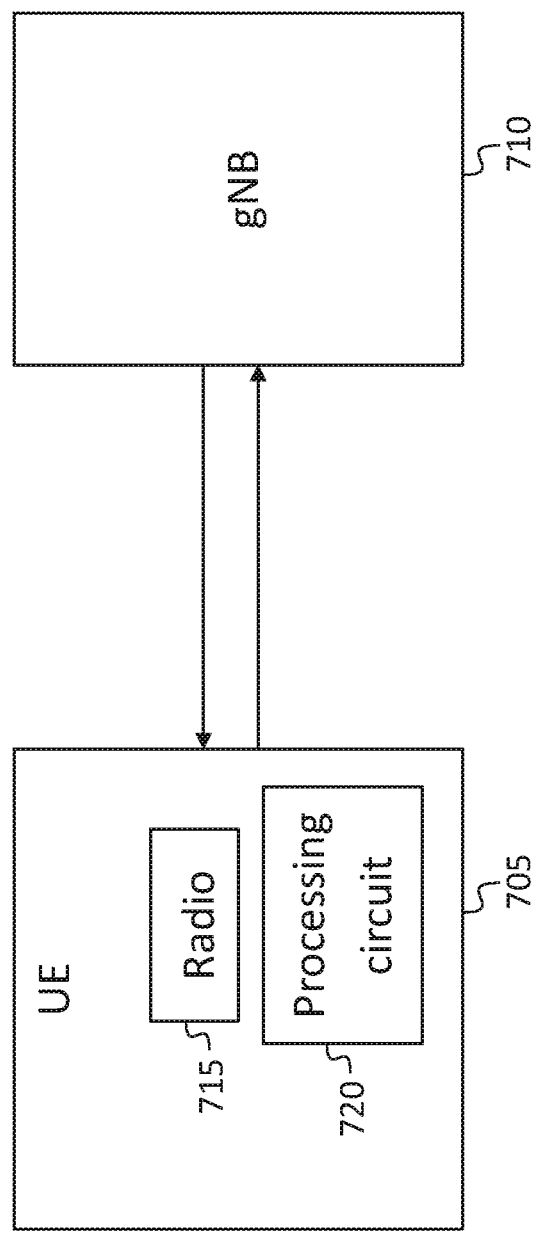
FIG. 7 is a block diagram of part of a mobile communications system, according to an embodiment of the present disclosure.

FIG. 6 shows a method for random access involving an NTN, according to some embodiments. The method includes calculating, at 605, by a user equipment (UE), a timing advance based on location information of the UE and location information of a non-terrestrial network node (gNB); randomly selecting, at 610, a random value from a plurality of values; and sending, at 615, at a transmission time, by the UE, to the gNB, a random access (RA) message. In this method, the RA message may include a signature. Further, the transmission time may differ from a nominal transmission time (i.e., the nominal transmission time being the transmission time corresponding to the TA without any intentionally added random delay) by an amount based on the random value, or the signature may differ from a nominal signature (the nominal signature lacking a cyclic shift) by a cyclic shift based on the random value. FIG. 7 shows a system including a UE 705 and a gNB 710, in communication with each other. The UE may include a radio 715 and a processing circuit (or a means for processing) 720, which may perform various methods disclosed herein, e.g., the method illustrated in FIG. 6. For example, the processing circuit 720 may receive, via the radio 715, transmissions from the gNB 710, and the processing circuit 720 may transmit, via the radio 715, signals to the gNB 710.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB. A processing circuit, or means for processing, in a UE, may perform methods described herein, e.g., by transmitting messages (through a radio of the UE) or by receiving messages (through the radio of the UE), and, in some instances, by performing further processing.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for random access procedures in a non-terrestrial network have been specifically described and illustrated herein, many modifications and variations will be apparent to those skilled in the art. Accordingly, it is to be understood that a system and method for random access procedures in a non-terrestrial network constructed according to principles of this disclosure may be embodied other than as specifically described herein. The invention is also defined in the following claims, and equivalents thereof.

What is claimed is:

1. A method, comprising:
    calculating, by a user equipment (UE), a timing advance based on:
        location information of the UE; and
        an ephemeris of a non-terrestrial network node;
    randomly selecting a random value from a plurality of values; and
    sending, at a transmission time, by the UE, to the non-terrestrial network node, a random access (RA) message,
    the RA message including a signature,
    wherein:
        the transmission time differs from a nominal transmission time by an amount based on the random value, the nominal transmission time being based on the timing advance, or
        the signature differs from a nominal signature by a cyclic shift based on the random value,
    wherein the amount based on the random value is less than a cyclic prefix (CP) of a PRACH occasion (RO).

2. The method of claim 1, further comprising receiving, by the UE, the ephemeris information.

3. The method of claim 1, wherein the RA message includes a preamble sequence.

4. The method of claim 3, wherein:
the RA message is transmitted via the RO.

5. The method of claim 1, wherein:
the RA message includes a preamble sequence.

6. The method of claim 5, wherein:
each of a plurality of cyclic shifts corresponds respectively to a value of the plurality of values;
a first cyclic shift of the plurality of cyclic shifts is the greatest one of the plurality of cyclic shifts less than a second cyclic shift of the plurality of cyclic shifts; and
the preamble sequence shifted by:
  the second cyclic shift,
    less a maximum supported channel delay spread of the UE and the non-terrestrial network node,
    less an uncertainty in the calculated timing advance,
is orthogonal to:
the preamble sequence shifted by the first cyclic shift.

7. The method of claim 1, further comprising:
selecting a delay value at random from a set of delay values; and
transmitting, by the UE, a demodulation reference signal (DMRS) via a Physical Uplink Shared Channel (PUSCH) occasion (PO),
the beginning of the transmission of the DMRS following the beginning of the PO by the delay value.

8. The method of claim 7, wherein the set of delay values comprises multiples of the duration of the DMRS.

9. The method of claim 1, wherein:
the RA message includes a preamble sequence,
the RA message is transmitted via a PRACH occasion (RO); and
the length of the preamble sequence is at least equal to a maximum supported channel delay spread.

10. The method of claim 9, wherein the length of the preamble sequence is the smallest prime number at least equal to a maximum supported channel delay spread.

11. The method of claim 1, wherein the RA message does not contain a preamble.

12. A system comprising:
a user equipment (UE), the UE comprising:
  a radio; and
  a processing circuit,
the processing circuit being configured to:
  calculate a timing advance based on:
    location information of the UE; and
    an ephemeris of a non-terrestrial network node;
  randomly select a random value from a plurality of values; and
  send, at a transmission time, by the UE, to the non-terrestrial network node, a random access (RA) message,
the RA message including a signature,
wherein:
  the transmission time differs from a nominal transmission time by an amount based on the random value,
    the nominal transmission time being based on the timing advance, or
  the signature differs from a nominal signature by a cyclic shift based on the random value,
wherein the amount based on the random value is less than a cyclic prefix (CP) of a PRACH occasion (RO).

13. The system of claim 12, wherein the processing circuit is further configured to receive the ephemeris information.

14. The system of claim 12, wherein the RA message includes a preamble sequence.

15. The system of claim 14, wherein:
the RA message is transmitted via the RO.

16. The system of claim 15, wherein:
the RA message includes a preamble sequence.

17. The system of claim 16, wherein:
each of a plurality of cyclic shifts corresponds respectively to a value of the plurality of values;
a first cyclic shift of the plurality of cyclic shifts is the greatest one of the plurality of cyclic shifts less than a second cyclic shift of the plurality of cyclic shifts; and
the preamble sequence shifted by:
  the second cyclic shift,
    less a maximum supported channel delay spread of the UE and the non-terrestrial network node,
    less an uncertainty in the calculated timing advance,
is orthogonal to:
the preamble sequence shifted by the first cyclic shift.

18. A system comprising:
a user equipment (UE), the UE comprising:
  a radio; and
  means for processing,
the means for processing being configured to:
  calculate a timing advance based on:
    location information of the UE; and
    an ephemeris of a non-terrestrial network node;
  randomly select a random value from a plurality of values; and
  send, at a transmission time, by the UE, to the non-terrestrial network node, a random access (RA) message,
the RA message including a signature,
wherein:
  the transmission time differs from a nominal transmission time by an amount based on the random value,
    the nominal transmission time being based on the timing advance, or
  the signature differs from a nominal signature by a cyclic shift based on the random value,
wherein the amount based on the random value is less than a cyclic prefix (CP) of a PRACH occasion (RO).

19. The method of claim 8, where the multiples of the duration of the DMRS comprises integer multiples equal to or greater than zero.

* * * * *